United States Patent
Marggraff et al.

(10) Patent No.: US 7,453,447 B2
(45) Date of Patent: Nov. 18, 2008

(54) INTERACTIVE APPARATUS WITH RECORDING AND PLAYBACK CAPABILITY USABLE WITH ENCODED WRITING MEDIUM

(75) Inventors: James Marggraff, Lafayette, CA (US); Alexander Chisholm, San Francisco, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 441 days.

(21) Appl. No.: 11/034,495

(22) Filed: Jan. 12, 2005

(65) Prior Publication Data

US 2006/0080608 A1    Apr. 13, 2006

Related U.S. Application Data

(63) Continuation-in-part of application No. 10/803,806, filed on Mar. 17, 2004, and a continuation-in-part of application No. 10/861,243, filed on Jun. 3, 2004.

(51) Int. Cl.
*G06F 3/033* (2006.01)
(52) U.S. Cl. .................. 345/179; 345/175; 345/176; 345/177; 178/19.01; 178/19.03
(58) Field of Classification Search ......... 345/173–179; 178/18.01–18.07, 19.01–19.06
See application file for complete search history.

(56) References Cited

U.S. PATENT DOCUMENTS

| | | | |
|---|---|---|---|
| 4,841,387 A | 6/1989 | Rindfuss | |
| 4,924,387 A | 5/1990 | Jeppesen | |
| 4,964,167 A | 10/1990 | Kunizawa et al. | |
| 5,007,085 A | 4/1991 | Greanias et al. | |
| 5,059,126 A | 10/1991 | Kimball | |
| 5,250,930 A * | 10/1993 | Yoshida et al. | 345/168 |
| 5,485,176 A * | 1/1996 | Ohara et al. | 345/173 |

(Continued)

FOREIGN PATENT DOCUMENTS

EP    0495618    7/1992

(Continued)

OTHER PUBLICATIONS

Kramer, "Translucent Patches-Dissolving Windows", Nov. 2, 1994 Symposium on user interface software and technology, pp. 121-130, XP000197943.

(Continued)

*Primary Examiner*—Vijay Shankar

(57) ABSTRACT

An interactive apparatus is disclosed. The interactive apparatus has an audio recording mode and an audio playback mode. Further, the interactive apparatus includes a writing tool for manually writing on an encoded writing medium, an audio input device for recording audio, an audio output device for playing the recorded audio. Moreover, the interactive apparatus has an optical unit for determining position on the encoded writing medium of the writing tool and for recognizing information on the encoded writing medium, wherein recognition of a recording-enabling graphical element on the encoded writing medium activates the audio recording mode and enables time-synchronization of creation of writing on the encoded writing medium with the writing tool and recording of the audio, and further wherein recognition of a playback-enabling graphical element on the encoded writing medium activates the audio playback mode and enables multiple techniques to control playback of the recorded audio.

37 Claims, 12 Drawing Sheets

U.S. PATENT DOCUMENTS

| | | | |
|---|---|---|---|
| 5,596,698 A | 1/1997 | Morgan | |
| 5,604,517 A * | 2/1997 | Filo | 345/173 |
| 5,855,483 A | 1/1999 | Collins et al. | |
| 5,914,707 A | 6/1999 | Kono | |
| 6,081,261 A | 6/2000 | Wolff et al. | |
| 6,199,042 B1 | 3/2001 | Kurzweil | |
| 6,502,756 B1 | 1/2003 | Fahraeus | |
| 6,665,490 B2 | 12/2003 | Copperman et al. | 386/95 |
| 6,966,495 B2 | 11/2005 | Lynggaard et al. | |
| 2002/0011989 A1 | 1/2002 | Ericson et al. | |
| 2002/0023957 A1 | 2/2002 | Michaelis et al. | |
| 2003/0001020 A1 | 1/2003 | Kardach | |
| 2003/0014615 A1 | 1/2003 | Lynggaard | |
| 2004/0140966 A1 | 7/2004 | Marggraff et al. | |
| 2004/0169695 A1 | 9/2004 | Forman | |
| 2004/0229195 A1 | 11/2004 | Marggraff et al. | |

FOREIGN PATENT DOCUMENTS

| | | |
|---|---|---|
| EP | 0866397 | 9/1998 |
| FR | 2811130 | 1/2002 |
| JP | 2002297308 | 10/2002 |
| JP | 2003-528402 | 9/2003 |
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | 2001/71653 | 9/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |
| WO | 2003083763 | 10/2003 |
| WO | 2004/084190 | 9/2004 |

OTHER PUBLICATIONS

Robertson G.G. et al:, "Buttons as First Class Objects on an X Desktop", Nov. 11, 1991, UIST '91.4th Annual Symposium on user interface software and technology. Proceedings of the ACM Symposium on user interface software and technology. Hilton Head, SC, Nov. 11-13, 1991, ACM symposium on user interface software and technology, New Yo, pp. 35-44, XP000315064.

* cited by examiner

INTERACTIVE APPARATUS WITH RECORDING AND PLAYBACK CAPABILITY USABLE WITH ENCODED WRITING MEDIUM

CROSS REFERENCE TO RELATED APPLICATION

This patent application is a Continuation-in-Part of co-pending, commonly-owned U.S. patent application Ser. No. 10/803,806, filed on Mar. 17, 2004, entitled "SCANNING APPARATUS", by Marggraff et al., which is incorporated herein by reference in its entirety. This patent application is a Continuation-in-Part of co-pending, commonly-owned U.S. patent application Ser. No. 10/861,243, filed on Jun. 3, 2004, entitled "USER CREATED INTERACTIVE INTERFACE", by Marggraff et al., which is incorporated herein by reference in its entirety.

BACKGROUND OF THE INVENTION

1. Field of the Invention

The present invention generally relates to writing mediums and devices that interact with writing mediums. More particularly, the present invention relates to interactive apparatus with recording and playback capability usable with encoded writing medium.

2. Related Art

When the computer was introduced, there was initial thought that the computer would lead to a paperless world. However, the computer has created new uses for paper. Moreover, the paper environment continues to integrate with the electronic environment.

Typically, technologies that merge the paper environment and the electronic environment are costly compared to a conventional sheet of paper. Further, these technologies simply duplicate the fundamental function of paper: storing a persistent image. None of these technologies bring interactive functionality to the paper environment.

Further, when an audio recording device and a writing medium are utilized together, there is no link between the writing on the writing medium and the recorded audio. That is, the audio recording device and the writing medium operate independently of each other. It is inconvenient and difficult to efficiently utilize both the audio recording device and the writing medium at the same time. Moreover, the recorded audio and the writing medium may be separated from each other and lost.

SUMMARY OF THE INVENTION

An interactive apparatus is disclosed. The interactive apparatus has an audio recording mode and an audio playback mode. Further, the interactive apparatus includes a writing tool for manually writing on an encoded writing medium, an audio input device for recording audio, an audio output device for playing the recorded audio. Moreover, the interactive apparatus has an optical unit for determining position on the encoded writing medium of the writing tool and for recognizing information on the encoded writing medium, wherein recognition of a recording-enabling graphical element on the encoded writing medium activates the audio recording mode and enables time-synchronization of creation of writing on the encoded writing medium with the writing tool and recording of the audio, and further wherein recognition of a playback-enabling graphical element on the encoded writing medium activates the audio playback mode and enables multiple techniques to control playback of the recorded audio.

In an embodiment, the interactive apparatus further comprises a memory unit for storing recorded audio and information associated with said writing. Also, the interactive apparatus includes a communication device for transmitting the position of the graphical element and the associated recorded audio to a remote storage location. The communication device may be a wireless communication device. The encoded writing medium may be paper encoded with a grid of dots. The writing tool is may be one of a pen and a pencil.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

FIG. 1 A illustrates an encoded writing medium 100 in accordance with an embodiment of the present invention. In one embodiment, the encoded writing medium 100 is paper encoded with a grid of dots compatible with technology described in detail in the following US Patents assigned to Anoto, a Swedish company, and are incorporated herein by reference in their entirety: U.S. Pat. Nos. 6,502,756; 6,548, 768; 6,570,104; 6,586,688; 6,663,008; 6,666,376; 6,667,695; 6,674,427; 6,689,966; 6,698,660; 6,722,574; 6,732,927; and 6,836,555. By reading a pattern of dots on the paper, a position (e.g., X and Y coordinates) on a predefined map can be determined. It should be understood that other types of encoded writing mediums may be utilized.

Figure 1A:
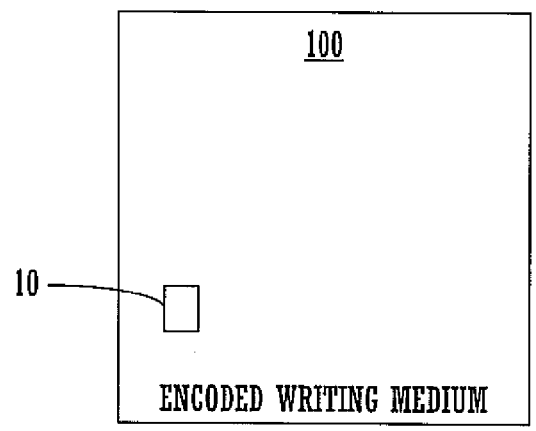
FIG. 1A illustrates an encoded writing medium in accordance with an embodiment of the present invention.
Figure 1B:
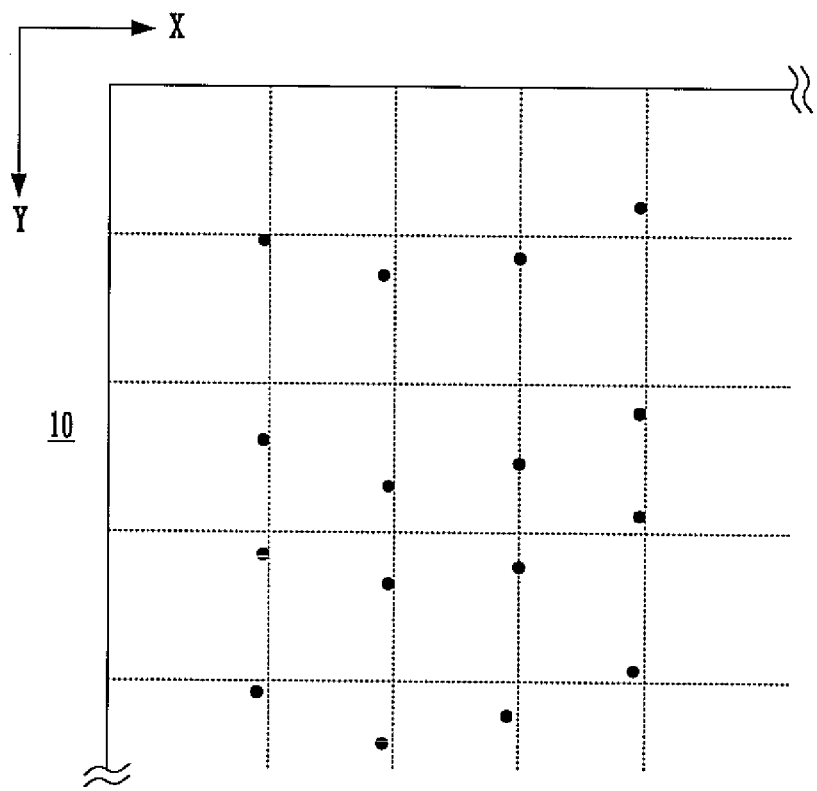
FIG. 1B illustrates a section of the encoded writing medium of FIG. 1A in greater detail in accordance with an embodiment of the present invention.

Continuing, FIG. 1B illustrates a section 10 of the encoded writing medium 100 of FIG. 1A in greater detail in accordance with an embodiment of the present invention. As depicted in FIG. 1B, each dot is slightly displaced from the X-axis and from the Y-axis.

Figure 2:
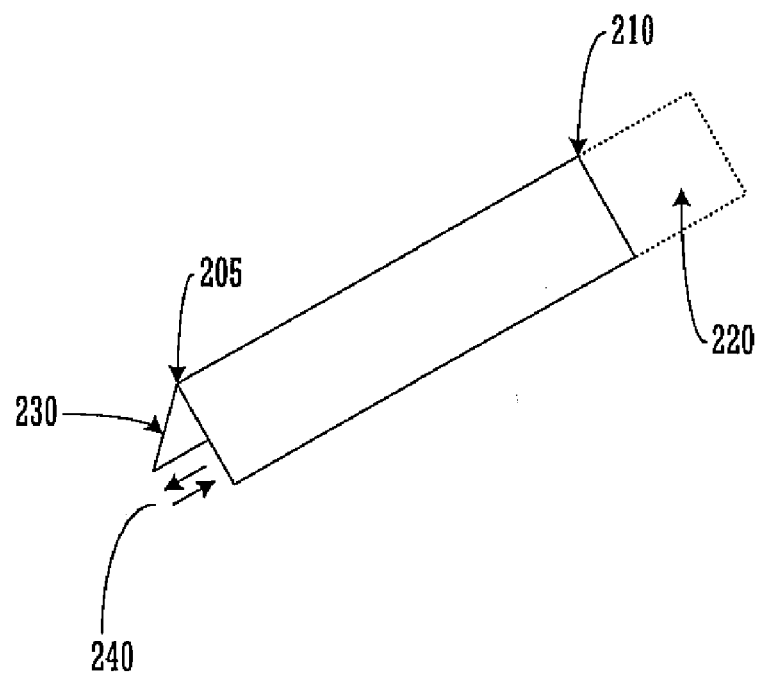
FIG. 2 illustrates an interactive apparatus in accordance with an embodiment of the present invention.

FIG. 2 illustrates an interactive apparatus 200 in accordance with an embodiment of the present invention. As shown in FIG. 2, the interactive apparatus 200 includes a writing/position detection end 205 and an expansion end 210 for coupling a removable functionality expansion unit 220. The writing/position detection end 205 includes a writing tool 230 and optics that uses light 240 to detect the dot pattern for determining position on the encoded writing medium 100. The interactive apparatus 200 may be utilized by a user. In an embodiment, the interactive apparatus 200 is shaped for use as a writing instrument by the user.

Figure 3A:
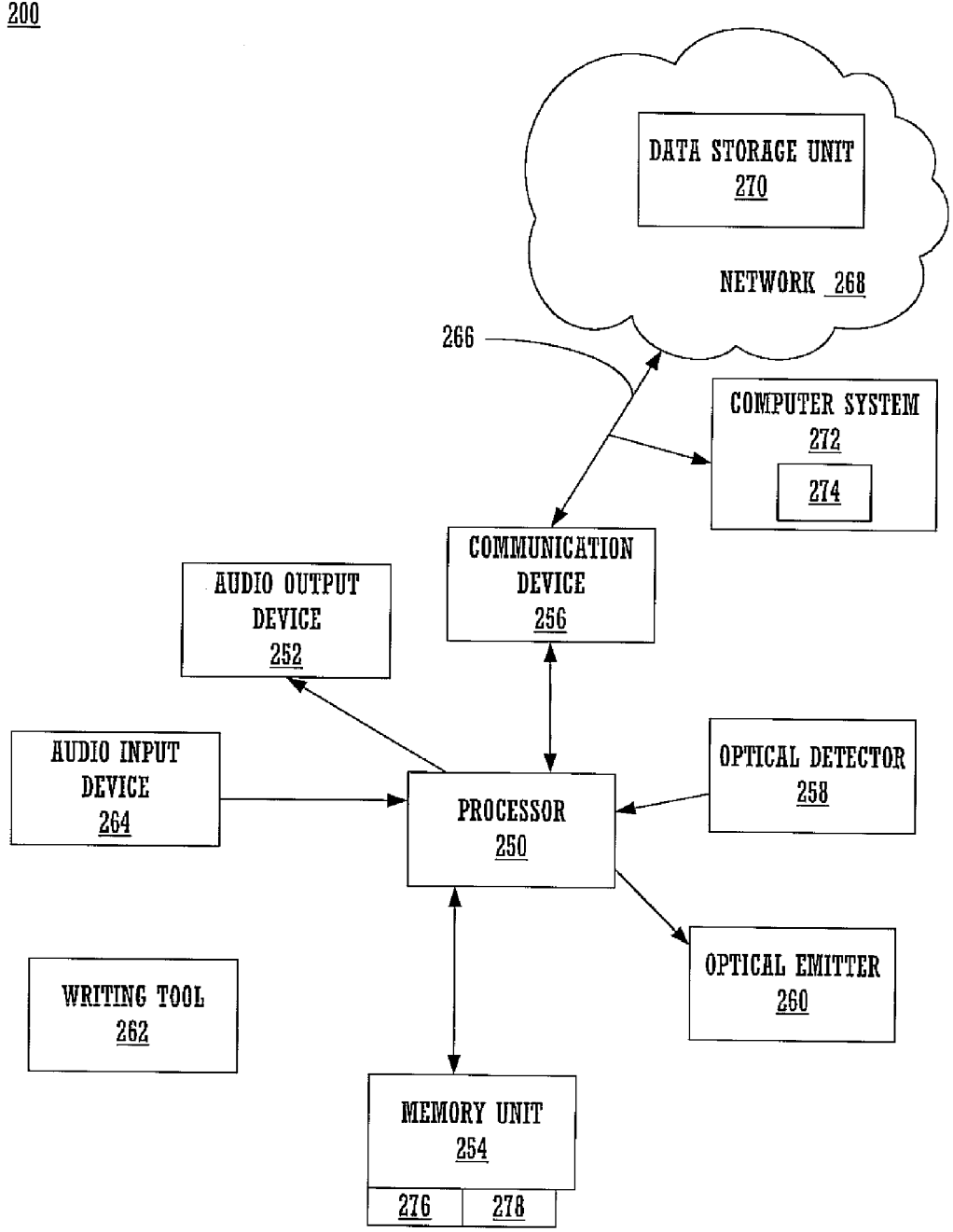
FIG. 3A illustrates a block diagram of the interactive apparatus of FIG. 2 in accordance with an embodiment of the present invention.

A block diagram of the interactive apparatus 200 of FIG. 2 in accordance with an embodiment of the present invention is illustrated in FIG. 3A. As shown in FIG. 3A, the interactive apparatus 200 includes a processor 250, an optical detector 258, an optical emitter 260, a memory unit 254, an audio input device for recording audio, an audio output device for playing audio, a communication device 256, and a writing tool 262. The writing tool is used for manually writing on the encoded writing medium 100. Examples of writing tools include a pen and a pencil. The processor 250, the optical detector 258, and the optical emitter 260 form an optical unit, which determines position on the encoded writing medium 100 of the interactive apparatus 200 and recognizes information on the encoded writing medium 100. In particular, the position of the writing tool 262 on the encoded writing medium 100 is determined. In an embodiment, the optical emitter 260 is a light-emitting diode while the optical detector 258 is a light-sensitive sensor for recording a two-dimensional image, which is processed to determine position on the encoded writing medium 100. Examples of light-sensitive sensors include a CCD sensor and a CMOS sensor.

The interactive apparatus 200 has an audio recording mode for recording audio via the audio input device 264 and an audio playback mode for playing the recorded audio via the audio output device 252. In an embodiment, the recorded audio is stored in a digital format by the audio recoding component/device of the interactive apparatus 200. As will be described below, recognition of a recording-enabling graphical element on the encoded writing medium activates the audio recording mode and enables time-synchronization of creation of writing on the encoded writing medium with the writing tool and recording of the audio. Further, recognition of a playback-enabling graphical element on the encoded writing medium activates the audio playback mode and enables multiple techniques to control playback of the recorded audio. The memory unit 254 may store recorded audio 278 and information 276 associated with the created writing on the encoded writing medium 100. Information 276 may include position data, character recognition information, etc. Additionally, the memory unit 254 may store code/instructions for providing the functionality of the interactive apparatus 200. The optical unit enables the interactive apparatus 200 to recognize graphical elements on the encoded writing medium 100 that activate/deactivate corresponding functionality of the interactive apparatus 200. Also, optical unit may capture and store optical images of writing on surface of the encoded writing medium 100 during recording of the audio in the audio recording mode.

In an embodiment, multiple techniques for controlling playback of the recorded audio may include using control-enabling graphical elements to control playback of the recorded audio and using the created writing and the time-synchronization to indicate where to start playback of the recorded audio based on location of the writing tool 262 on the created writing on the encoded writing medium 100. This facilitates dynamically creating visual cues for the audio on the encoded writing medium 100 with the writing tool 262 of the interactive apparatus 200.

The communication device 256 is configured to communicate with network 268 and computer system 272 via communication link 266. The network 268 has a data storage unit 270 while the computer system 272 has a hard drive 274. In an embodiment, the communication device 256 is a wireless communication device while the communication link 266 is a wireless communication link. The communication device 256 may transmit at least a portion of the information 276 associated with the created writing on the encoded writing medium 100 and at least a portion of the recorded audio 278 to a remote storage location such as the data storage unit 270 and the hard drive 274 to manage memory capacity or for long term storage.

Figure 3B:
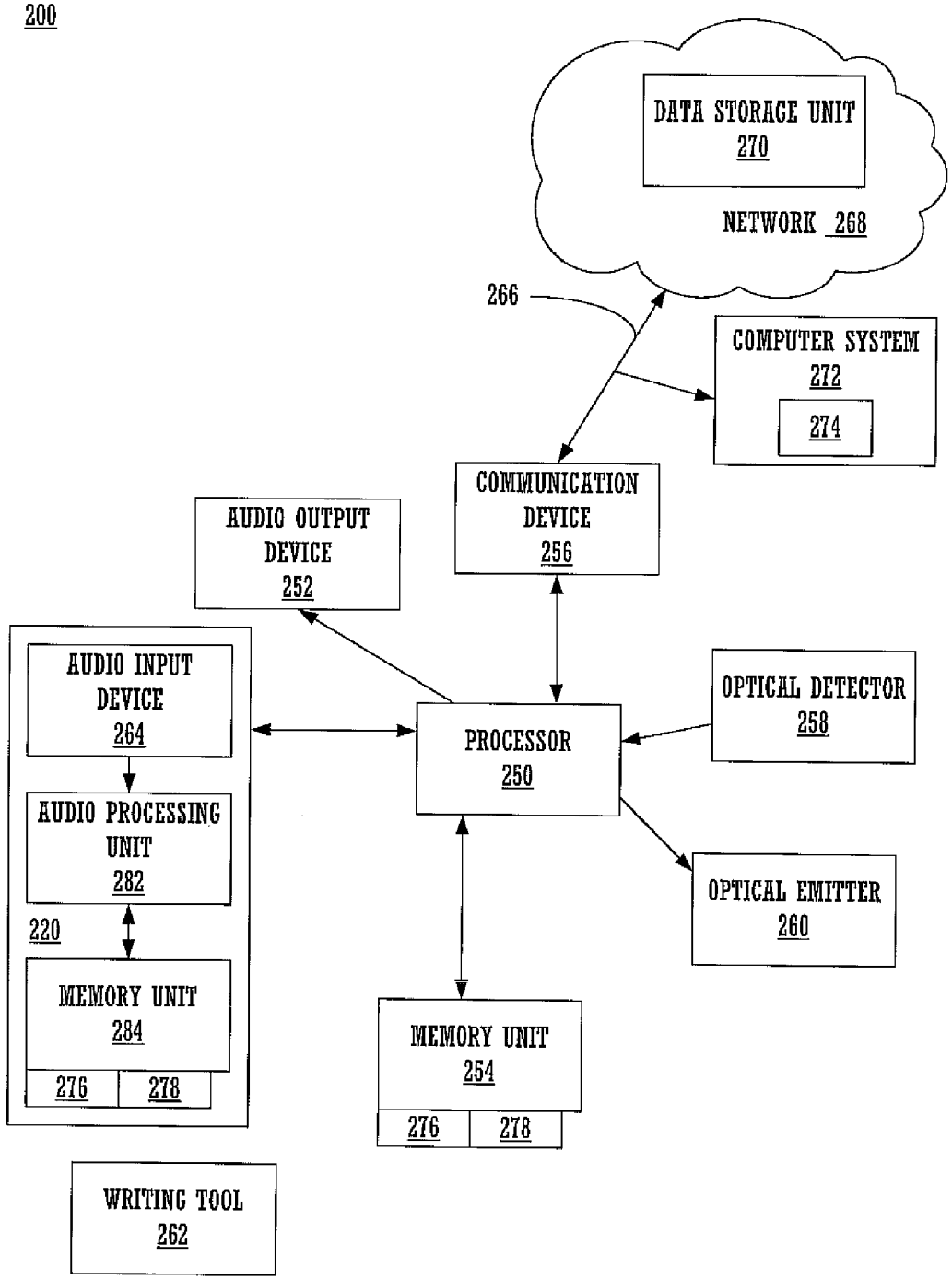
FIG. 3B illustrates a block diagram of the interactive apparatus of FIG. 2 in accordance with another embodiment of the present invention.

FIG. 3B illustrates a block diagram of the interactive apparatus 200 of FIG. 2 in accordance with another embodiment of the present invention. The discussion of FIG. 3A applies to FIG. 3B except as noted below. In FIG. 3B, a removable functionality expansion unit 220 is coupled to the interactive apparatus 200. The removable functionality expansion unit 220 includes an audio input device 264, an audio processing unit 284, and memory unit 284. The memory unit 284 may store recorded audio 278 and information 276 associated with the created writing on the encoded writing medium 100.

Figure 4A:
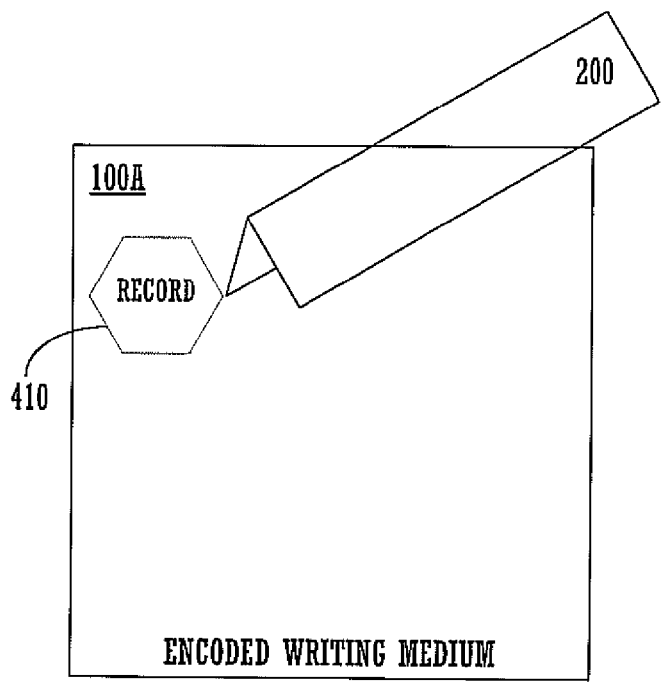
FIGS. 4A, 4B, and 4C illustrate an audio recoding mode of the interactive apparatus of FIG. 2 in accordance with an embodiment of the present invention.
Figure 4A:
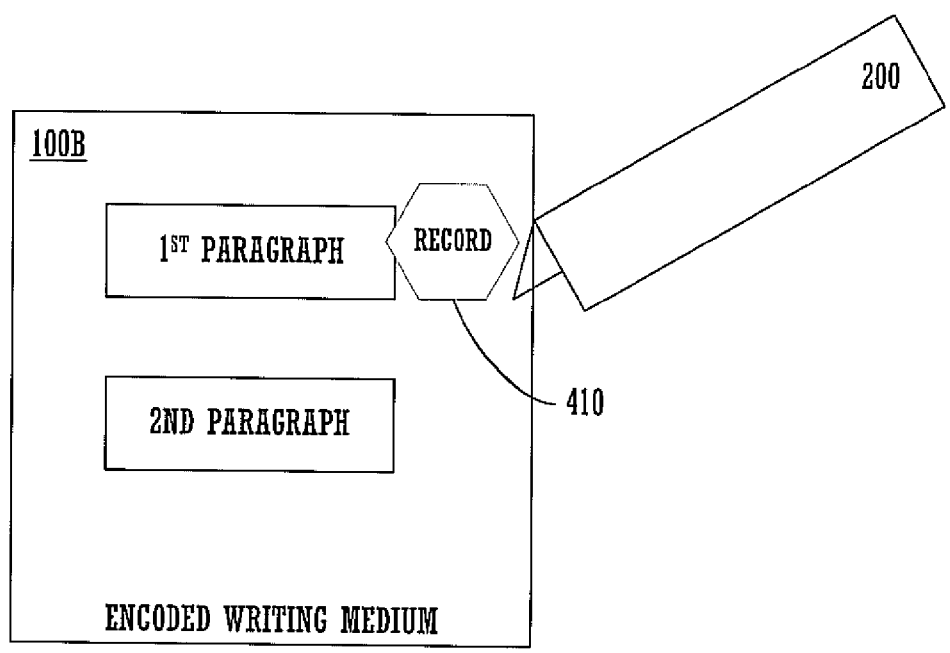
Figure 4B:
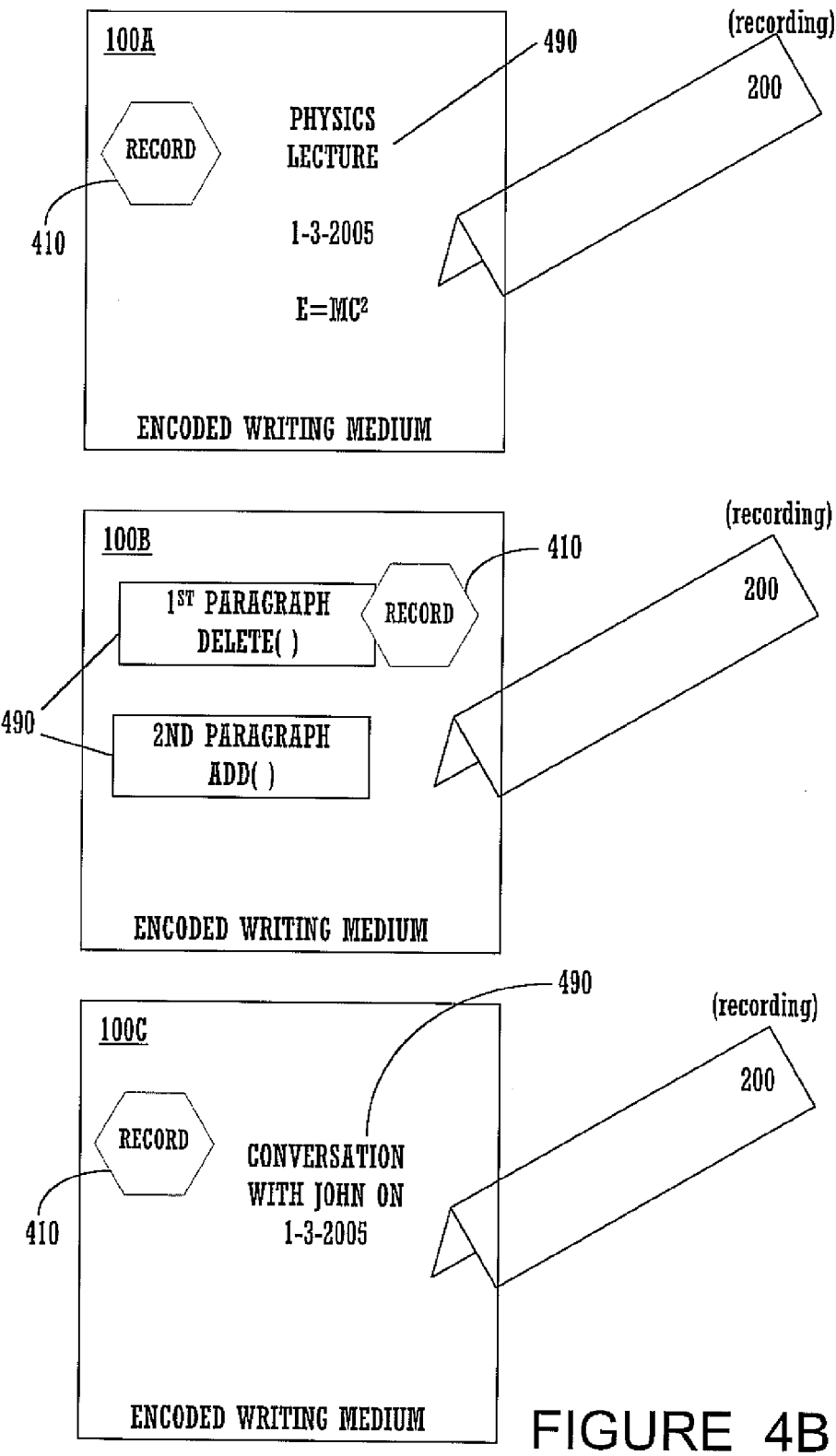
Figure 4C:
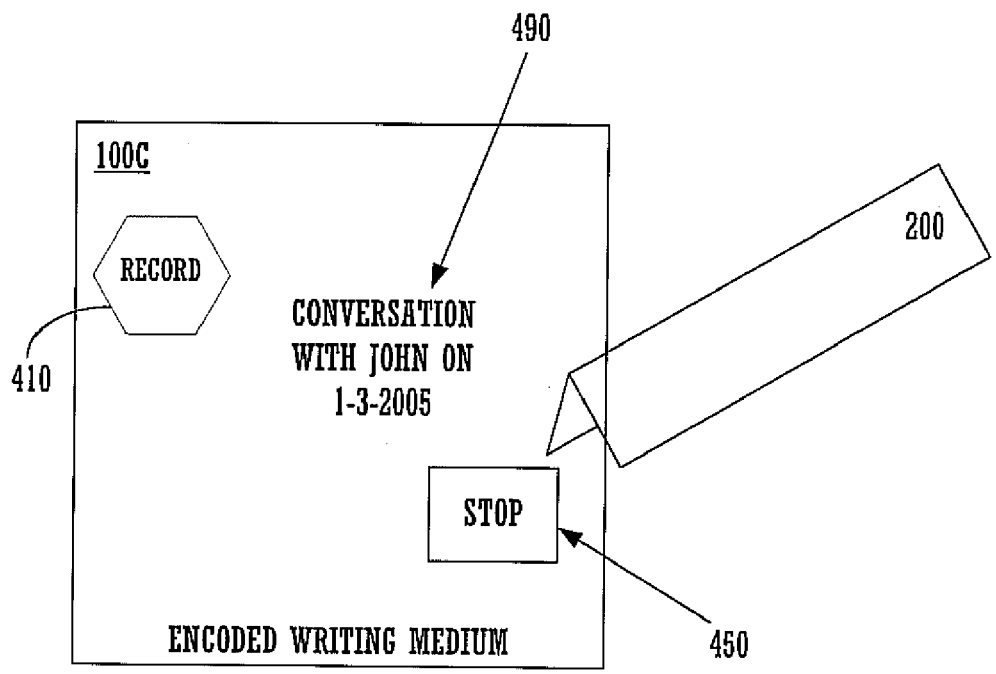

FIGS. 4A, 4B, and 4C illustrate an audio recoding mode of the interactive apparatus 200 of FIG. 2 in accordance with an embodiment of the present invention. Referring to FIG. 4A, the encoded writing medium 100A initially may have no writing (printed writing or manual writing). Alternatively, the encoded writing medium 100B initially may have printed writing and/or manual writing. The interactive apparatus 200 may be utilized to draw the recording-enabling graphical element 410 on the encoded writing medium 100A. Alternatively, the recording-enabling graphical element 410 may be preprinted on the encoded writing medium 100A. The interactive apparatus 200 is configured to recognize the recording-enabling graphical element 410 and then to activate the audio recording mode of the interactive apparatus 200. The recording-enabling graphical element 410 shown in FIG. 4A is exemplary. The design of the recording-enabling graphical element 410 may be different than that shown. In response to recognizing the recording-enabling graphical element 410, the audio recoding mode of the interactive apparatus 200 is selected. The recognition may involve tapping on the recording-enabling graphical element 410 and following audio prompts given by the interactive apparatus 200. This enables dynamic tagging of audio to the encoded writing medium 100A and 100B via the recording-enabling graphical element 410. That is, audio and the encoded writing medium are visually integrated.

Continuing with FIG. 4B, once the interactive apparatus 200 is in the audio recoding mode, the interactive apparatus 200 records audio. While recording the audio, the interactive apparatus 200 may be utilized to manually write on the encoded writing medium 100A, 100B, and 100C. Moreover, the interactive apparatus 200 time-synchronizes the creation of writing 490 on the encoded writing medium 100 with the writing tool 262 and recording of the audio. The audio may be recorded digitally into the memory unit 254 and 284 and/or stored remotely from the interactive apparatus 200. Also, the interactive apparatus 200 obtains information associated with the created writing 490 on the encoded writing medium 100. The information may include position data, character recognition information, etc. The encoded writing medium 100A provides an example of writing notes and recording the class lecture.

Continuing, the encoded writing medium 100B provides an example of reviewing and editing printed writing and/or manual writing and recording audio comments in addition to or instead of written comments. Lastly, the encoded writing medium 100C provides an example of writing notes while recording a conversation. The interactive apparatus 200 may capture and store optical images of the writing (printed writing or manual writing) on the surface of the encoded writing medium 100A, 100B, and 100C during recording of the audio in the audio recording mode. This enables the generation and printing of another encoded writing medium having the same writing (printed writing or manual writing) on the surface of the encoded writing medium for use by another user having an interactive apparatus. As described above, the recorded audio, information associated with the created writing 490 on the encoded writing medium, and optical images of the writing (manually created and preprinted) may be stored locally and/or in a remote storage location such as the data storage unit 270 and the hard drive 274.

In an embodiment, multiple techniques for controlling playback of the recorded audio may include using control-enabling graphical elements 450 (See FIGS. 5A, 5B, and 5C) to control playback of the recorded audio and using the created writing 490 and the time-synchronization to indicate where to start playback of the recorded audio based on location of the writing tool 262 on the created writing 490 on the encoded writing medium. This facilitates dynamically creating visual cues for the audio on the encoded writing medium with the writing tool 262 of the interactive apparatus 200.

At FIG. 4C, the audio recoding mode of the interactive apparatus 200 may be deactivated in response to recognition of at least one of the plurality of control-enabling graphical elements 450 on the encoded writing medium 100C. The recognition may involve tapping on the control-enabling graphical element 450 and following audio prompts given by the interactive apparatus 200. The interactive apparatus 200 may be utilized to draw the control-enabling graphical element 450 on the encoded writing medium 100C. Alternatively, the control-enabling graphical element 450 may be preprinted on the encoded writing medium 100C. The control-enabling graphical element 450 shown in FIG. 4C is exemplary. The design of the control-enabling graphical element 450 may be different than that shown.

Figure 5A:
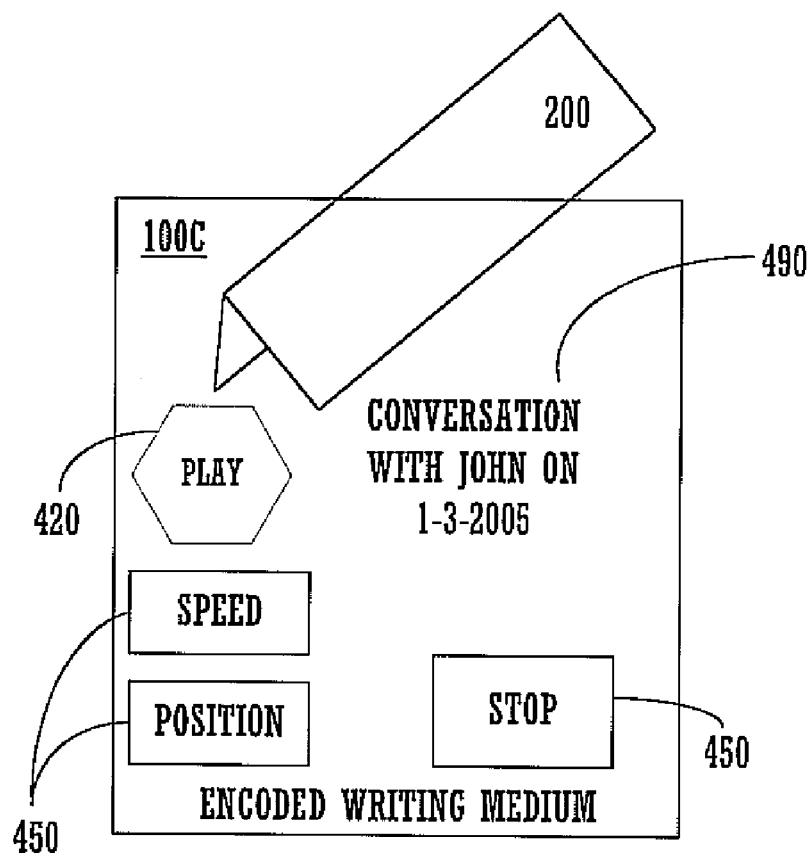
FIGS. 5A, 5B, and 5C illustrate an audio playback mode of the interactive apparatus of FIG. 2 in accordance with an embodiment of the present invention.
Figure 5B:
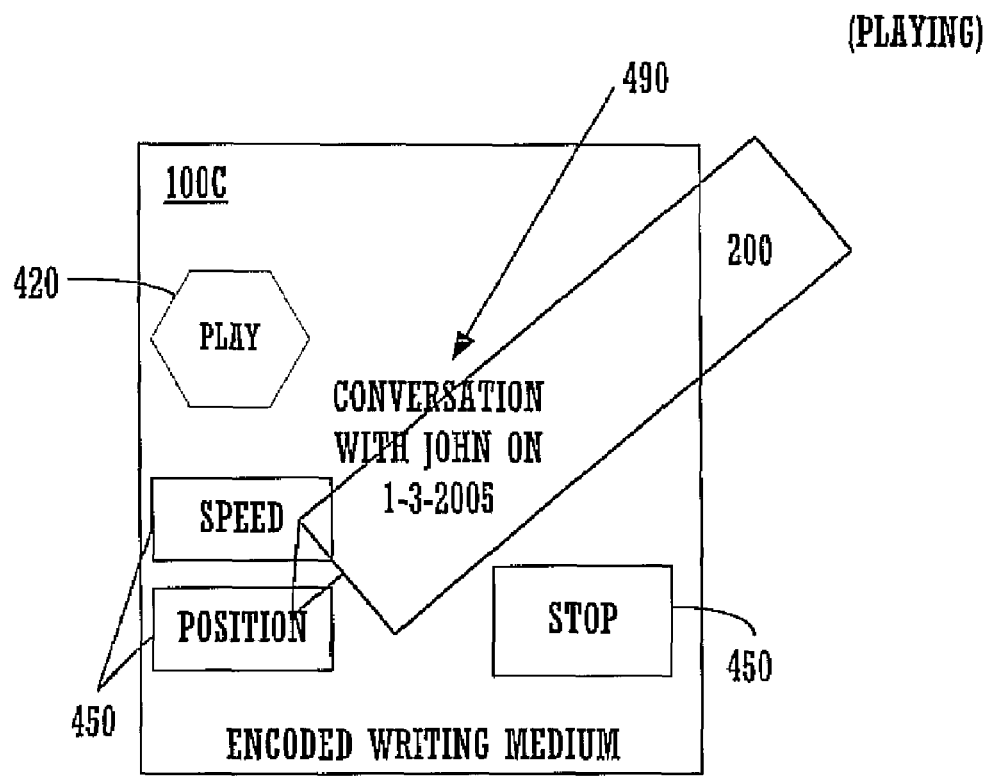
Figure 5C:
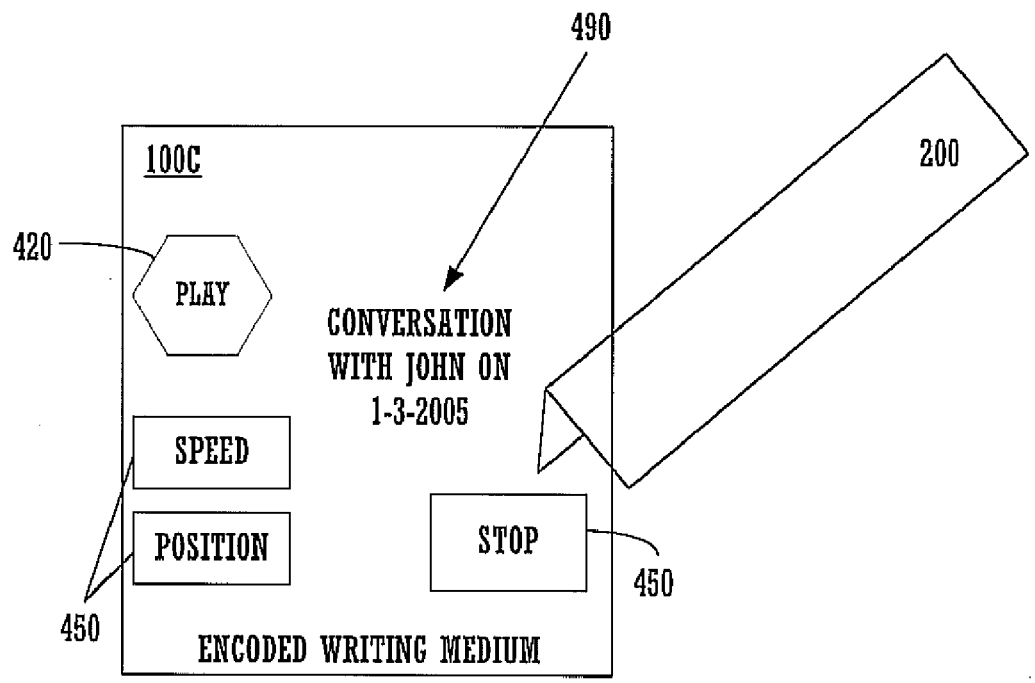

FIGS. 5A, 5B, and 5C illustrate an audio playback mode of the interactive apparatus of FIG. 2 in accordance with an embodiment of the present invention. Referring to FIG. 5A, the interactive apparatus 200 is configured to recognize the playback-enabling graphical element 420 and then to activate the audio playback mode of the interactive apparatus 200. The playback-enabling graphical element 420 shown in FIG. 5A is exemplary. The design of the playback-enabling graphical element 420 may be different than that shown. In response to recognizing the playback-enabling graphical element 420, the audio playback mode of the interactive apparatus 200 is selected. The recognition may involve tapping on the playback-enabling graphical element 420 and following audio prompts given by the interactive apparatus 200. The interactive apparatus 200 may be utilized to draw the playback-enabling graphical element 420 and the control-enabling graphical elements 450 on the encoded writing medium 100C, wherein the control-enabling graphical elements 450 control playback of the recorded audio in the audio playback mode. Alternatively, the playback-enabling graphical element 420 and the control-enabling graphical elements 450 may be preprinted on the encoded writing medium 100C. The control-enabling graphical elements 450 shown in FIG. 5A are exemplary. The design of the control-enabling graphical elements 450 may be different than that shown. The interactive apparatus 200 is configured to recognize the control-enabling graphical elements 450 and then to enable controlling playback of the recorded audio in the audio playback mode of the interactive apparatus 200.

Continuing with FIG. 5B, once the interactive apparatus 200 is in the audio playback mode, the recorded audio 278 associated with the writing 490 on the encoded writing medium 100C is retrieved. The recorded audio 278 is played using the interactive apparatus 200. The recorded audio may be retrieve from local storage such as memory units 254 and 284.

Also, the recorded audio may be retrieve from remote storage such as the data storage unit 270 and the hard drive 274 via the communication link 266. Moreover, information associated with the created writing 490 on the encoded writing medium 100C may be retrieved from local storage (e.g., memory units 254 and 284) and/or remote storage (e.g., the data storage unit 270 and the hard drive 274) via the communication link 266. While in the audio playback mode, the interactive apparatus 200 may be utilized to recognize the control-enabling graphical elements 450. The recognition may involve tapping on the control-enabling graphical elements 450 and following audio prompts given by the interactive apparatus 200. Controls such delay, pause, play, rewind, forward, fast forward, fast rewind, speed, and stop are provided by the control-enabling graphical elements 450.

As described above, multiple techniques for controlling playback of the recorded audio may include using control-enabling graphical elements 450 to control playback of the recorded audio and using the created writing 490 and the time-synchronization to indicate where to start playback of the recorded audio based on location of the writing tool 262 on the created writing 490 on the encoded writing medium 100C.

At FIG. 5C, the audio playback mode of the interactive apparatus 200 may be deactivated in response to recognition of at least one of the plurality of control-enabling graphical elements 450 on the encoded writing medium 100C. The recognition may involve tapping on the control-enabling graphical element 450 and following audio prompts given by the interactive apparatus 200.

Figure 6A:
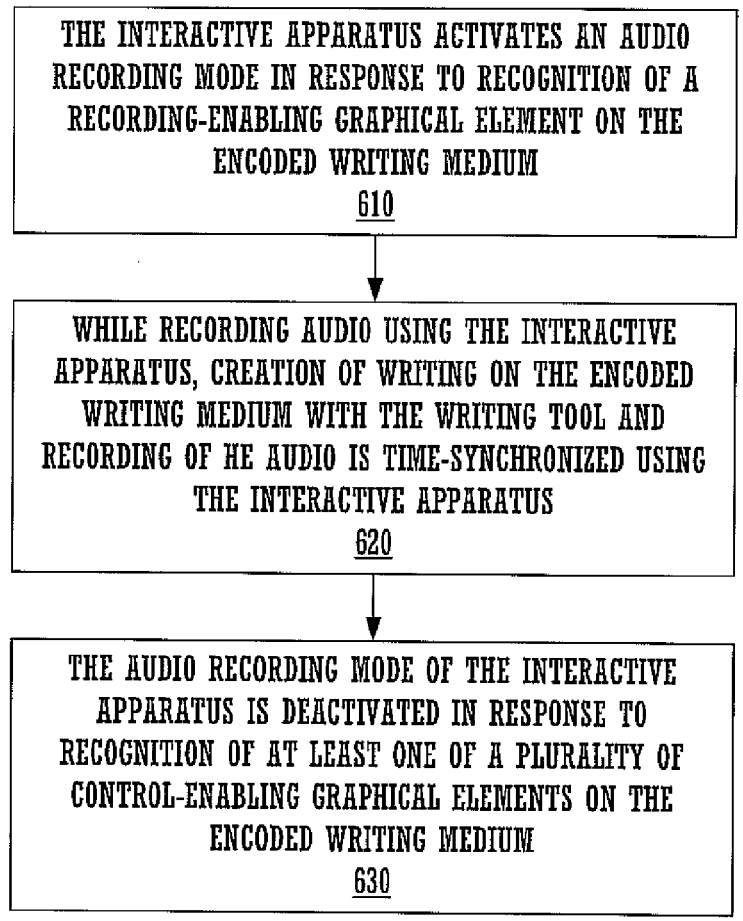
FIG. 6A illustrates a flow chart showing the audio recoding mode of the interactive apparatus of FIG. 2 in accordance with an embodiment of the present invention.

FIG. 6A illustrates a flow chart 600 showing the audio recoding mode of the interactive apparatus of FIG. 2 in accordance with an embodiment of the present invention. Reference is made to FIGS. 1A-5C.

At Block 610, the interactive apparatus 200 activates an audio recording mode in response to recognition of a recording-enabling graphical element 410 on the encoded writing medium 100. The recording-enabling graphical element 410 may be drawn with the writing tool 262 or may be preprinted on the encoded writing medium 100. The recognition may involve tapping on the recording-enabling graphical element 410 and following audio prompts given by the interactive apparatus 200.

Further, at Block 620, while recording audio using the interactive apparatus 200, creation of writing on the encoded writing medium 100 with the writing tool 262 and recording of the audio is time-synchronized using the interactive apparatus 200.

Furthermore, at Block 630, the audio recording mode of the interactive apparatus 200 is deactivated in response to recognition of at least one of a plurality of control-enabling graphical elements 450 on the encoded writing medium 100. The recorded audio 278 and information 276 associated with the created writing on the encoded writing medium 100 may be stored locally (e.g., memory units 254 and 284) and/or in a remote storage location such as the data storage unit 270 and the hard drive 274. Also, the recorded audio 278 and information 276 associated with the created writing on the encoded writing medium 100 may be maintained in local memory (e.g., memory units 254 and 284) and/or in remote storage location (e.g., the data storage unit 270 and the hard drive 274) and may be retrieved later during the audio playback mode in response to recognition of other graphical elements or location of the writing tool 262 on created writing on the encoded writing medium 100.

Figure 6B:
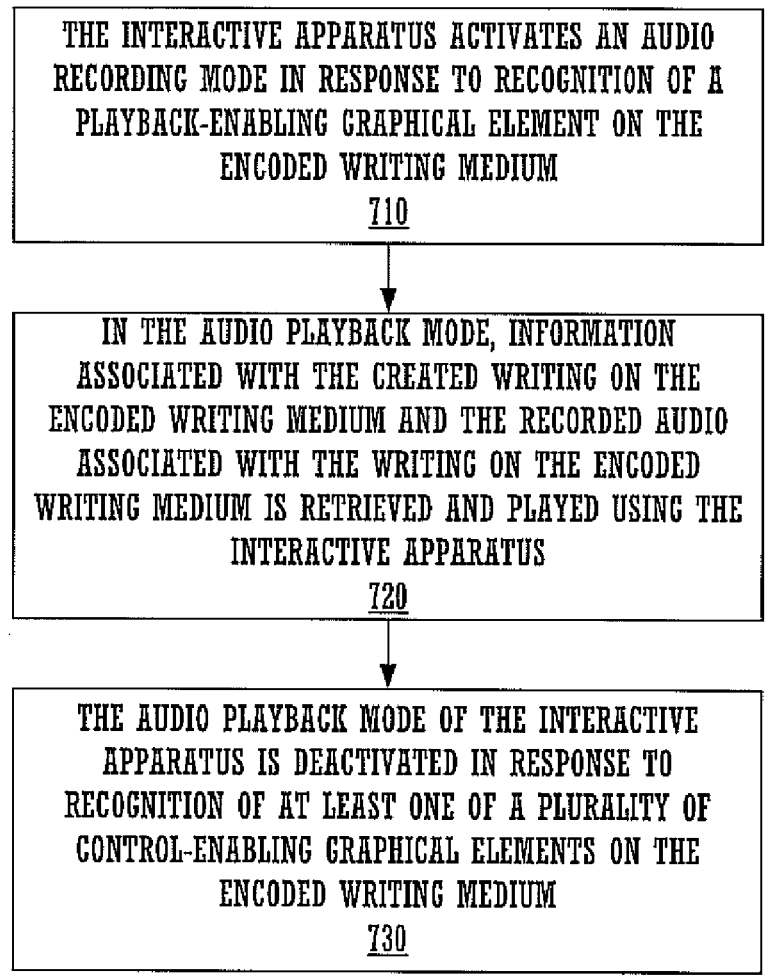
FIG. 6B illustrates a flow chart showing the audio playback mode of the interactive apparatus of FIG. 2 in accordance with an embodiment of the present invention.

FIG. 6B illustrates a flow chart 700 showing the audio playback mode of the interactive apparatus of FIG. 2 in accordance with an embodiment of the present invention. Reference is made to FIGS. 1A-5C.

At Block 710, the interactive apparatus 200 activates an audio recording mode in response to recognition of a playback-enabling graphical element 420 on the encoded writing medium 100. The playback-enabling graphical element 420 may be drawn with the writing tool 262 or may be preprinted on the encoded writing medium 100. The recognition may involve tapping on the playback-enabling graphical element 420 and following audio prompts given by the interactive apparatus 200.

Further, at Block 720, in the audio playback mode, the recorded audio 278 associated with the writing on the encoded writing medium 100 is retrieved. The recorded audio 278 is played using the interactive apparatus 200. The recorded audio may be retrieved from local memory (e.g., memory units 254 and 284) and/or from a remote storage location (e.g., data storage unit 270 and the hard drive 274) via a wireless link. Control-enabling graphical elements 450 on the encoded writing medium 100 may be used. Also, information 276 associated with the created writing on the encoded writing medium 100 may be retrieved from local memory (e.g., memory units 254 and 284) and/or from a remote storage location (e.g., data storage unit 270 and the hard drive 274) via a wireless link.

Furthermore, at Block 730, the audio playback mode of the interactive apparatus 200 is deactivated in response to recognition of at least one of the plurality of control-enabling graphical elements 450 on the encoded writing medium 100. Also, the recorded audio 278 and information 276 associated with the created writing on the encoded writing medium 100 may be maintained in local memory (e.g., memory units 254 and 284) and/or in remote storage location (e.g., the data storage unit 270 and the hard drive 274) and may be retrieved later during the audio playback mode in response to recognition of other graphical elements or location of the writing tool 262 on created writing on the encoded writing medium 100.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An interactive apparatus having an audio recording mode and an audio playback mode, comprising:
    a writing tool for manually writing non-electronic information on an encoded writing medium comprising a plurality of visual non-electronic markings representing encoded position information;
    an audio input device for recording audio;
    an audio output device for playing said recorded audio; and
    an optical unit for determining position on said encoded writing medium of said writing tool based on said encoded position information and for recognizing said encoded position information and non-electronic information on said encoded writing medium, wherein recognition of a non-electronic recording-enabling graphical element on said encoded writing medium by said optical unit activates said audio input device in said audio recording mode and enables time-synchronization of creation of writing on said encoded writing medium with said writing tool and recording of said audio, and further wherein recognition of a non-electronic playback-enabling graphical element on said encoded writing medium by said optical unit activates said audio output device in said audio playback mode and enables multiple techniques to control playback of said recorded audio.

2. The interactive apparatus as recited in claim 1 further comprising a memory unit for storing recorded audio and information associated with said writing.

3. The interactive apparatus as recited in claim 1 further comprising a communication device for transmitting recorded audio and information associated with said writing to a remote storage location.

4. The interactive apparatus as recited in claim 3 wherein said communication device comprises a wireless communication device.

5. The interactive apparatus as recited in claim 1 wherein said encoded writing medium comprises paper encoded with a grid of dots.

6. The interactive apparatus as recited in claim 1 wherein said writing tool is one of a pen and a pencil.

7. The interactive apparatus as recited in claim 1 wherein said non-electronic recording-enabling graphical element and said non-electronic playback-enabling graphical element are drawn on said encoded writing medium with said writing tool.

8. The interactive apparatus as recited in claim 1 wherein recognition of non-electronic control-enabling graphical elements on said encoded writing medium by said optical unit enables controlling said audio recording mode and said audio playback mode; and wherein said multiple techniques include using said non-electronic control-enabling graphical elements to control playback of said recorded audio and using said writing and said time-synchronization to indicate where to start playback of said recorded audio based on location of said writing tool on said writing on said encoded writing medium.

9. The interactive apparatus as recited in claim 1 wherein said optical unit comprises a processor, an optical emitter, and an optical detector.

10. The interactive apparatus as recited in claim 1 wherein said optical unit further captures and stores optical images of writing on a surface of said encoded writing medium during recording of said audio in said audio recording mode.

11. A system comprising:
a network comprising a data storage unit; and
an interactive apparatus having an audio recording mode and an audio playback mode, comprising:
a writing tool for manually writing non-electronic information on an encoded writing medium comprising a plurality of visual non-electronic markings representing encoded position information;
an audio input device for recording audio;
an audio output device for playing said recorded audio;
an optical unit for determining position on said encoded writing medium of said writing tool based on said encoded position information and for recognizing said encoded position information and non-electronic information on said encoded writing medium, wherein recognition of a non-electronic recording-enabling graphical element on said encoded writing medium by said optical unit activates said audio input device in said audio recording mode and enables time-synchronization of creation of writing on said encoded writing medium with said writing tool and recording of said audio, and further wherein recognition of a non-electronic playback-enabling graphical element on said encoded writing medium by said optical unit activates said audio output device in said audio playback mode and enables multiple techniques to control playback of said recorded audio; and
a communication device for communicating with said network, wherein said communication device transmits at least a portion of said recorded audio and at least a portion of information associated with said writing to said data storage unit for storage.

12. The system as recited in claim 11 wherein said interactive apparatus further comprises a memory unit for storing at least a portion of said recorded audio and at least a portion of information associated with said writing.

13. The system as recited in claim 11 further comprising a computer system comprising a hard drive, wherein said communication device communicates with said computer system, and wherein said communication device transmits at least a portion of said recorded audio and at least a portion of information associated with said writing to said hard drive for storage.

14. The system as recited in claim 11 wherein said communication device comprises a wireless communication device.

15. The system as recited in claim 11 wherein said encoded writing medium comprises paper encoded with a grid of dots.

16. The system as recited in claim 11 wherein said writing tool is one of a pen and a pencil.

17. The system as recited in claim 11 wherein said non-electronic recording-enabling graphical element and said non-electronic playback-enabling graphical element are drawn on said encoded writing medium with said writing tool.

18. The system as recited in claim 11 wherein recognition of non-electronic control-enabling graphical elements on said encoded writing medium by said optical unit enables controlling said audio recording mode and said audio playback mode; and wherein said multiple techniques include using said non-electronic control-enabling graphical elements to control playback of said recorded audio and using said writing and said time-synchronization to indicate where to start playback of said recorded audio based on location of said writing tool on said writing on said encoded writing medium.

19. The system as recited in claim 11 wherein said optical unit comprises a processor, an optical emitter, and an optical detector.

20. The system as recited in claim 11 wherein said optical unit further captures and stores optical images of writing on a surface of said encoded writing medium during recording of said audio in said audio recording mode.

21. A method of visually integrating audio and an encoded writing medium using an interactive apparatus, said method comprising:
activating an audio recording mode of said interactive apparatus in response to recognition of a non-electronic recording-enabling graphical element on said encoded writing medium comprising a plurality of visual non-electronic markings representing encoded position information; wherein said interactive apparatus comprises a writing tool, an audio input device, and an audio output device;
while recording audio using said interactive apparatus, time-synchronizing creation of writing representing non-electronic information on said encoded writing medium with said writing tool and recording of said audio using said interactive apparatus; and
deactivating said audio recording mode of said interactive apparatus in response to recognition of at least one of a plurality of non-electronic control-enabling graphical elements on said encoded writing medium.

22. The method as recited in claim 21 further comprising:
activating an audio playback mode of said interactive apparatus in response to recognition of a non-electronic playback-enabling graphical element on said encoded writing medium;
in said audio playback mode, retrieving recorded audio associated with said writing representing said non-electronic information and playing said recorded audio using said interactive apparatus; and
deactivating said audio playback mode of said interactive apparatus in response to recognition of at least one of said plurality of non-electronic control-enabling graphical elements on said encoded writing medium.

23. The method as recited in claim 22 further comprising:
using said non-electronic control-enabling graphical elements to control playback of said recorded audio; and
using said writing and said time-synchronization to indicate where to start playback of said recorded audio based on location of said writing tool on said writing on said encoded writing medium.

24. The method as recited in claim 21 further comprising:
storing recorded audio and information associated with said writing in a memory unit of said interactive apparatus.

25. The method as recited in claim 21 further comprising:
wirelessly transmitting recorded audio and information associated with said writing to a remote storage location.

26. The method as recited in claim 21 wherein said encoded writing medium comprises paper encoded with a grid of dots.

27. The method as recited in claim 21 wherein said writing tool is one of a pen and a pencil.

28. The method as recited in claim 27 wherein said non-electronic recording-enabling graphical element is drawn with said writing tool.

29. The method as recited in claim 21 further comprising:
capturing and storing optical images of said writing on surface of said encoded writing medium during recording of said audio in said audio recording mode.

30. A method of processing audio recording comprising:
in response to recognition of a first non-electronic graphical element on a writing surface useable for writing in a non-electronic format thereon, performing a recording of an audio signal, wherein said recognition is made with a writing instrument comprising: a processor; memory; and an audio recording device;
in response to recognition of a second non-electronic graphical element on said writing surface, ending said recording, wherein said recognition is made with said writing instrument; and
storing said recording in digital form and storing time-synchronization between said recording of said audio signal and any writing representing non-electronic information created with said writing instrument during said recording.

31. A method as described in claim 30 wherein said storing is performed on a computer system remote to said writing instrument.

32. A method as described in claim 30 wherein said writing instrument further comprises a sensor for sensing a surface location of said writing instrument on said writing surface and further comprising storing in memory real-time surface location information of said writing instrument at discrete periods of time during said recording.

33. A method as described in claim 30 further comprising invoking a playback of said recording in response to recognition of a third non-electronic graphical element by said writing instrument and wherein said invoking said playback comprises:
accessing said recording for playback; and
rendering audible said recording.

34. A method as described in claim 33 wherein said accessing is performed wirelessly involving a storage system remote to said writing instrument.

35. A method as described in claim 33 further comprising adjusting said playback of said recording in response to recognition of a non-electronic playback control graphical element on said writing surface.

36. A method as described in claim 33 further comprising adjusting said playback of said recording in response to location of said writing instrument on any writing made during said recording; and wherein said playback is moved to a segment of said recording that was recorded near in time to when said writing was made.

37. A method as described in claim 30 wherein said writing instrument further comprises a sensor for capturing optical images of said writing on said writing surface during recording of said audio signal.

* * * * *